(12) United States Patent
De Vries et al.

(10) Patent No.: US 6,325,180 B1
(45) Date of Patent: Dec. 4, 2001

(54) ELECTRIC ACTUATOR AND CALLIPER BRAKE COMPRISING SUCH ACTUATOR

(75) Inventors: Alexander Jan Carel De Vries, Tiel; Armin Herbert Emil August Olschewski; Hendrikus Jan Kapaan, both of Nieuwegein; Johannes Albertus Van Winden, Oudewater, all of (NL); Clair Druet, Drumettaz Clarafond (FR); Roland Haas, Hofheim (DE)

(73) Assignee: SKF Engineerings and Research Centre B.V., Nieuwegein (NL)

( * ) Notice: Subject to any disclaimer, the term of this patent is extended or adjusted under 35 U.S.C. 154(b) by 0 days.

(21) Appl. No.: 09/446,505

(22) PCT Filed: Jun. 18, 1998

(86) PCT No.: PCT/NL98/00353

§ 371 Date: Feb. 9, 2000

§ 102(e) Date: Feb. 9, 2000

(87) PCT Pub. No.: WO99/02883

PCT Pub. Date: Jan. 21, 1999

(30) Foreign Application Priority Data

Jul. 10, 1997 (NL) .................................................. 1006543

(51) Int. Cl.⁷ .................................................. F16D 55/08
(52) U.S. Cl. .................................. 188/72.1; 188/162
(58) Field of Search .................. 188/72.1, 72.8, 188/72.7, 163, 72.2, 72.3, 106 A, 156, 158, 162; 384/516, 517, 482, 483

(56) References Cited

U.S. PATENT DOCUMENTS

| | | | |
|---|---|---|---|
| 3,008,559 | * 11/1961 | Forster | 384/516 X |
| 3,370,899 | * 2/1968 | Eklund | 384/516 |
| 3,482,892 | 12/1969 | Schluter et al. | . |
| 4,215,907 | 8/1980 | Pohl | . |
| 4,343,521 | * 8/1982 | Akabane et al. | 384/516 X |
| 4,565,457 | * 1/1986 | Flander | 384/516 X |
| 4,804,073 | 2/1989 | Taig et al. | . |
| 4,863,293 | * 9/1989 | Sytsma | 384/482 |
| 4,865,162 | * 9/1989 | Morris et al. | 188/72.8 |
| 5,251,510 | 10/1993 | Trim et al. | . |
| 5,425,585 | * 6/1995 | Hoffmann et al. | 384/483 |
| 5,829,557 | * 11/1998 | Halasy-Wimmer et al. | 188/162 |
| 5,915,504 | * 6/1999 | Doricht | 188/72.1 |
| 6,158,558 | * 12/2000 | Bill et al. | 188/162 |

FOREIGN PATENT DOCUMENTS

| | | |
|---|---|---|
| 30 46 812 A1 | 7/1982 | (DE) . |
| 0 291 138 A1 | 11/1988 | (EP) . |
| 0 291 138 B1 | 11/1988 | (EP) . |
| 0 743 470 A1 | 11/1996 | (EP) . |
| 1 357 526 | 6/1974 | (GB) . |
| 09 088947 A | 3/1997 | (JP) . |
| 09 042994 A | 6/1997 | (JP) . |
| WO 96/03301 | 2/1996 | (WO) . |
| WO 97/11287 | 3/1997 | (WO) . |

* cited by examiner

Primary Examiner—Douglas C. Butler
Assistant Examiner—Melanie Torres
(74) Attorney, Agent, or Firm—Oliff & Berridge, PLC

(57) ABSTRACT

An electric actuator (13) comprises a housing (7) which contains a screw mechanism (11) and an electric motor (5) which is driveably connected to the screw mechanism which provides a linear movement in response to a rotational movement of the electric motor (5), said screw mechanism (11) comprising a screw (12) and a nut (13) one of which is supported rotatably with respect to the housing (17) by means of an angular contact ball bearing (31), said angular contact ball bearing (31) comprising two pairs of contact points the working lines (40,41) of which intersect each other. One pair of contact points has a working line (41), the angle of which with respect to the axis (42) of the bearing (21) is smaller than the corresponding angle of the other working (40) line.

48 Claims, 4 Drawing Sheets

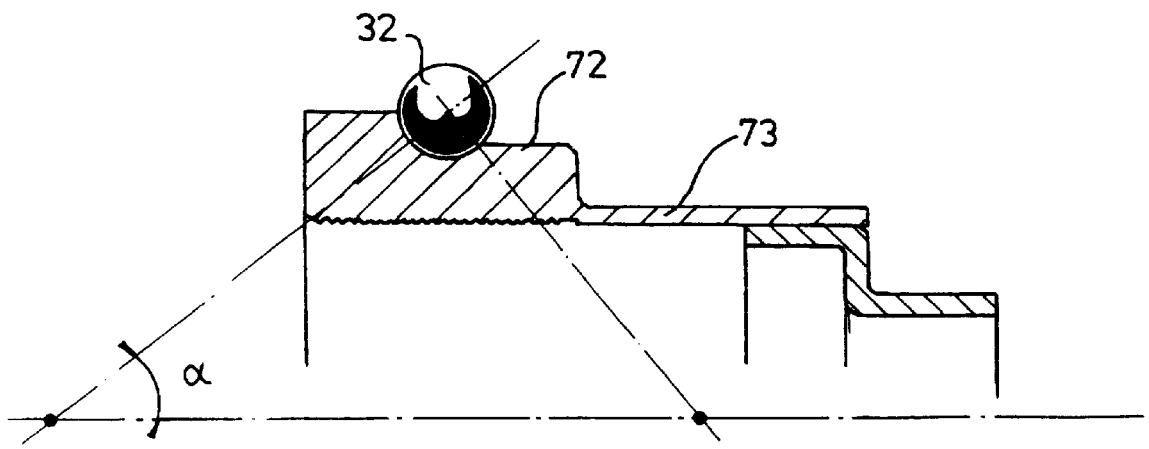
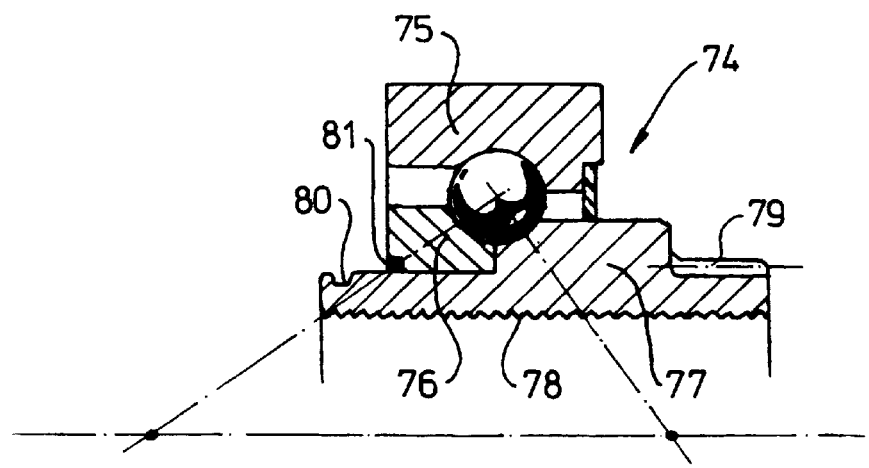

ELECTRIC ACTUATOR AND CALLIPER BRAKE COMPRISING SUCH ACTUATOR

BACKGROUND OF THE INVENTION

1. Field of the Invention

The invention is related to an electric actuator, comprising a screw mechanism and an electric motor which is driveably connected to the screw mechanism which provides a linear movement in response to a rotational movement of the electric motor, said screw mechanism comprising a screw and a nut one of which is supported rotatably with respect to the housing by means of an angular contact ball bearing, said angular contact ball bearing comprising two pairs of contact points the working lines of which intersect each other.

2. Description of Related Art

Such actuator is known from WO-A-9603301. The screw member thereof protrudes from a housing, in which housing said screw member is slidably guided by means of a pair of supports. In most applications, said known actuator behaves satisfactorily for providing a rectilinear movement. However, its proper behaviour can only be guaranteed in case said movement and also the loadings are strictly in line with the axis of the screw member. For applications in which the screw member is loaded transversely, and/or is displaced transversely due to external influences exerted by an external actuatable component, the actuator will be blocked and eventually destroyed.

SUMMARY OF THE INVENTION

The object of the invention is to provide an actuator of this kind which provides a better support of the nut, and thereby of the screw member, in relation to the transverse loadings and/or displacements. This object is achieved by one pair of contact points having a working line the contact angle of which with respect to the axis of the bearing is smaller than the corresponding contact angle of the other working line.

In the actuator according to the invention, the nut is supported particularly well with respect to axial loadings in one direction, i.e. in the direction of forces which exert a load on the pair of contact points having a working line with a smaller contact angle with respect to the axis. In the other direction, a limited loading is also possible. The stability of the bearing with respect to bending moments is maintained to a large degree, and also with respect to combinations of such moments with respect to axial and radial loadings.

The outer ring or the inner ring of the angular contact ball bearing is a split outer ring respectively a split inner ring comprising two axial halves, which are pressed against one another under axial forces for providing the desired bearing clearance (positive or negative).

Furthermore, the axial ring halves may have facing radial abutment faces.

The axial ring halves may be connected to each other, and may be preloaded in axial direction, by means of a clamping means.

According to a first possibility, the nut is rotatably supported and driveably connected to the electric motor, and the screw mechanism may comprise a hollow screw having a central bore opening out at one end of the screw and accommodating an actuating member, which actuating member protrudes from the open end and is connected to the screw at a distance from said open end.

The actuating member of the actuator according to this embodiment may be connected to an external component, which means that any transverse forces exerted on and/or displacements of such external component will have no direct influence on the screw member. Thus, said screw member will be exposed mainly to axial loadings, which safeguards its proper functioning.

Preferably, the actuating member is accommodated with a radial play within the hollow screw. This radial play may be tuned with respect to the expected transverse displacements.

The actuator can be connected to the hollow screw in several ways. For instance, the end of the actuator could be connected to the internal end wall of a bottom which closes the internal hollow space of the screw. In particular, the actuating member can be connected to the screw by means of a sleeve which fits between said member and screw, which sleeve is at a distance from the open end and which is shorter than said member and the bore.

According to a second possibility, the screw may be rotatably supported and driveably connected to the electric motor, and the nut is connected to a brake pad support.

In particular, the screw may be connected to a concentric mounting sleeve, which mounting sleeve at least partly surrounds the screw and which is connected to the inner ring of the angular contact ball bearing, the nut being accommodated at least partly between mounting sleeve and screw.

The screw mechanism may comprise a roller spindle or a ball spindle. A particular favourable embodiment, which requires little space, is obtained in case the nut of the spindle forms an integral part of the inner bearing ring of an axial thrust bearing.

The angular contact ball being may be either a single row four-point contact ball bearing, or a double row angular contact ball bearing.

The actuator according to the invention can be applied in various fields. In particular however, said actuator is fit for a brake calliper, comprising a claw piece with two opposite brake pads and an electric actuator according to any of the preceding claims, said actuator comprising an electric motor and a screw mechanism which is driveably connected to the electric motor for providing a linear movement in response to a rotational movement of the electric motor, said screw mechanism comprising a screw and a nut which is supported rotatably with respect to the housing by means of full complement four-point contact ball bearing, said four-point contact ball bearing comprising two pairs of contact points the working lines of which intersect each other. Such brake calliper is also known from WO-A-9603301.

In a brake calliper, the actuator is mainly loaded in one and the same direction, i.e. in the direction of pressing the brake pads onto the brake disc. According to the invention, advantageous use is made of the actuator described before, in that one pair contact points has a working line the angle of which with respect to the axis of the bearing is smaller than the corresponding angle of the other working line.

In particular, the pair of contact points with a working line having an angle with respect to the axis of the bearing less than the corresponding angle of the other working line, is loaded by the brake force exerted on the brake pads.

Preferably, the outer ring of the four-point contact ball bearing comprises two axial halves, which are pressed against one another under axial forces for providing the desired bearing clearance.

The working line of the pair of contact points which is loaded by the brake force exerted on the brake pads, may have a contact angle with respect to the axis of the bearing less than 45°.

In a preferred embodiment, the screw mechanism may comprise a hollow screw having a central bore opening out at one end of the screw and accommodating an actuating member, which actuating member protrudes from the open end and is connected to the screw within the bore at a distance from said open end, wherein the actuating member cooperates with one of the brake pads and the screw mechanism cooperates with the opposite brake pad.

As is usual in disc brakes, the pads thereof have some transverse play within the claw piece, which play manifests itself as soon as said pads are pressed onto the rotating disc to be braked. The actuating member of the actuator according to this embodiment is perfectly fit for taking such play, thus preventing the screw mechanism from getting blocked.

The stator of the electric motor may be connected to the claw piece, and the rotatable part of said motor may be connected to the screw mechanism. Furthermore, the electric motor can be accommodated on a support piece which is rotatably supported in the claw piece, and which is in cooperation with the nut of a roller spindle or a ball spindle.

Preferably, the screw mechanism of the brake calliper is a roller spindle or a ball spindle; the nut of the spindle may form an integral part of the inner bearing ring of an axial thrust bearing.

BRIEF DESCRIPTION OF THE DRAWINGS

Subsequently, the invention will be described further with reference to embodiments of a brake calliper as shown in the figures.

FIGS. 4 and 5 show alternative bearing arrangements for these embodiments.

DETAILED DESCRIPTION OF PREFERRED EMBODIMENTS

Figure 1:
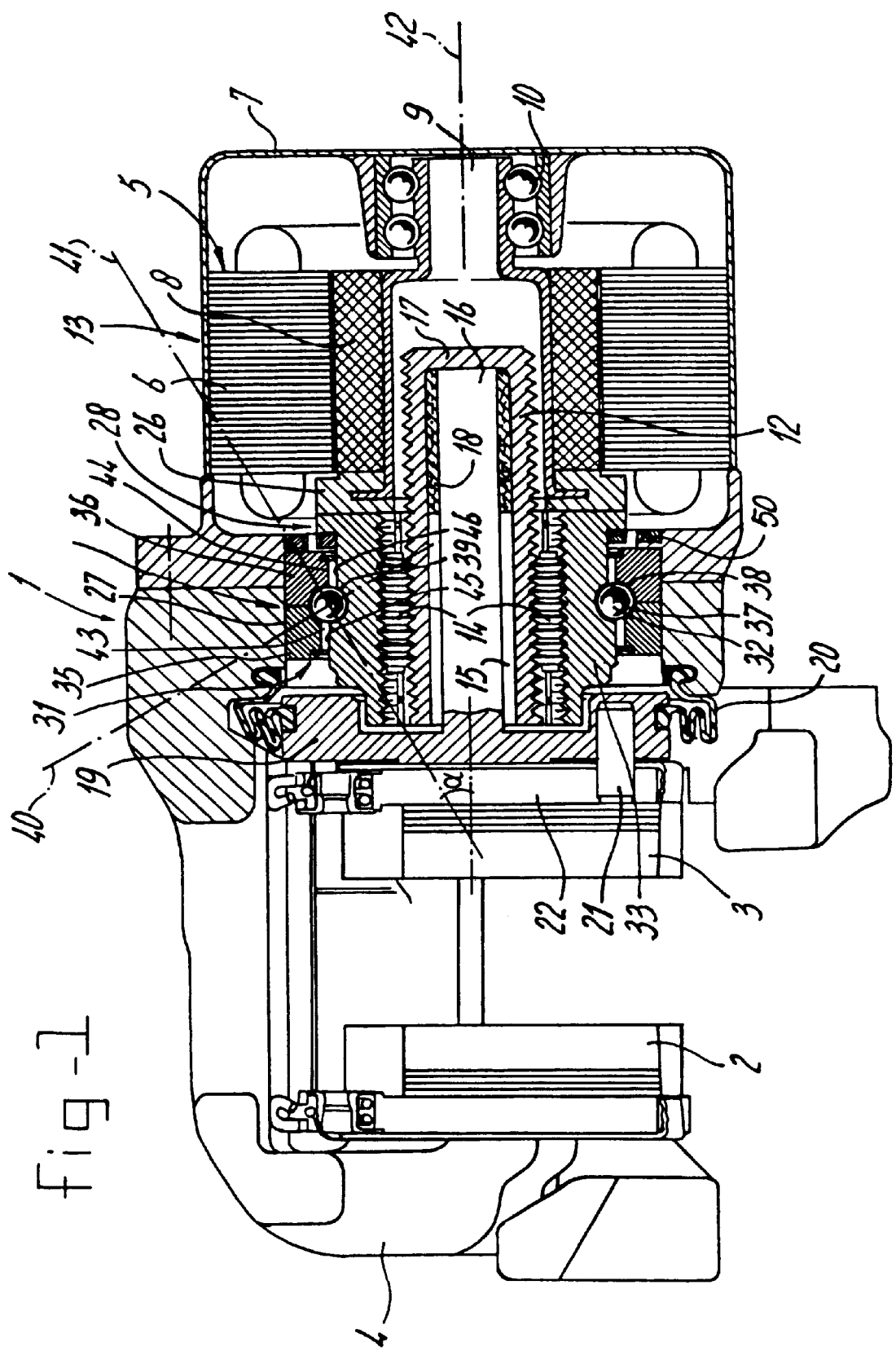
FIG. 1 shows a first embodiment.

The brake calliper shown in FIG. 1 has a claw piece 1, which in the usual way comprises two brake pads 2, 3. Brake pad 2 is connected to flange 4 of the claw piece 1; by means of support 22, brake pad 3 is connected to an electric actuator, indicated in its entirety with 13.

The electric actuator 13 comprises an electric motor 5, the stator 6 of which is connected to housing part 7 of the claw piece 1.

The rotational part 8 of the electric motor 5 is connected to a shaft piece 9, which by means of bearing 10 is rotatably supported in the housing portion 7 of claw piece 1.

The actuator 13 furthermore comprises a screw mechanism, which comprises inter alia a hollow screw 12 and nut member of an inner ring 33. The inner ring 33 and the screw member 12 co-operate by means of rolls 14, and constitute a roller spindle, which is known per se.

The rotational part 8 of the electric motor 5 is drivably connected to the nut member, such that upon rotation thereof the screw member 12 is displaced in axial direction via the rolls 14. In various embodiments, the rotation thereof is obtained by a hard turning operation.

The hollow screw member 12, the hollow space of which is indicated by 15, contains an actuating member 16 which extends from the closed bottom end 17 of the hollow screw member 12, and which protrudes from the open end thereof.

The actuating member 16 is connected to the screw member 12 near the bottom end 17 thereof, by means of a clamping sleeve 18.

At its protruding end, the actuating member 16 comprises an actuating head 19, which rests against support 22 of brake pad 3. This actuating head 19 is sealed with respect to the housing piece 7 of claw piece 1 by means of a bellows 20, which is known per se. As mentioned, between the brake pad 3 and the actuating head 19, there is a support member 22, which by means of pin 21 is rotatably fixed with respect to said actuating head 19.

As is usual, the brake pads 2, 3 have some play in a direction transverse with respect to the access of screw member 12. Thus, upon pressing the brake pads 2, 3 to a brake disc (not shown), said pads will exhibit some transverse movements with respect to the screw member 12. Due to the fact that the actuating member 16 is not rigidly connected to the screw member 12, the latter one will not be exposed to said transverse movements or loadings. Instead, the actuating member 16 will flex somewhat within the hollow space 15 of hollow screw member 12, which flexing movement is possible due to the radial play which exists between the actuating member 16 and the internal wall of the hollow space 15.

According to the invention, a four-point contact ball bearing 31 has been applied. Said bearing may have a split inner ring or a split out ring. This four-point contact ball bearing 31 comprises one series of rolling balls 32, the inner ring 33 which forms a unity with the nut member of screw mechanism, and an outer ring 34 comprising two outer ring halves 35, 36. These outer ring halves 35, 36 together define a raceway 37, 38; the inner ring 33 defines a raceway 39.

The raceways 37–39 are formed in such a way that four contact points are obtained, comprising two pairs which each define a working line 40, 41.

According to the invention, the raceways 37–39 have been formed in such a way that the working lines 40–41 intersect the axis of the bearing 31 under mutually different angles. Working line 40 intersects the axis 42 under a greater angle than working line 41. Thus, four-point contact ball bearing 31 according to the invention is in particular fit for taking the axial loads exerted by the brake pads 2, 3 when these are pressed onto the brake disc (not shown). In various embodiments, the rotation of the bearing 31 is obtained by a hard turning operation.

The particular orientation of the working lines 40, 41 is obtained by an oblique orientation of the raceways 37–39. This orientation results from the relatively large diameter of the inner surface or land 43 of outer bearing ring half 35, and the smaller inner diameter of the inner surface or land 44 of outer ring half 36.

Also, the outer surface or land 45 of the inner ring 34 has a diameter which is larger than the outer surface or land 46 thereof.

The four-point contact ball bearing 31 furthermore comprises a sensor 50, the parts of which are connected to outer ring halve 36 and to inner ring 33. This sensor may serve basic functions such as giving information concerning wear compensation, maintenance indication, brake force feedback (ABS), traction control and for vehicle dynamic functions.

Figure 2:
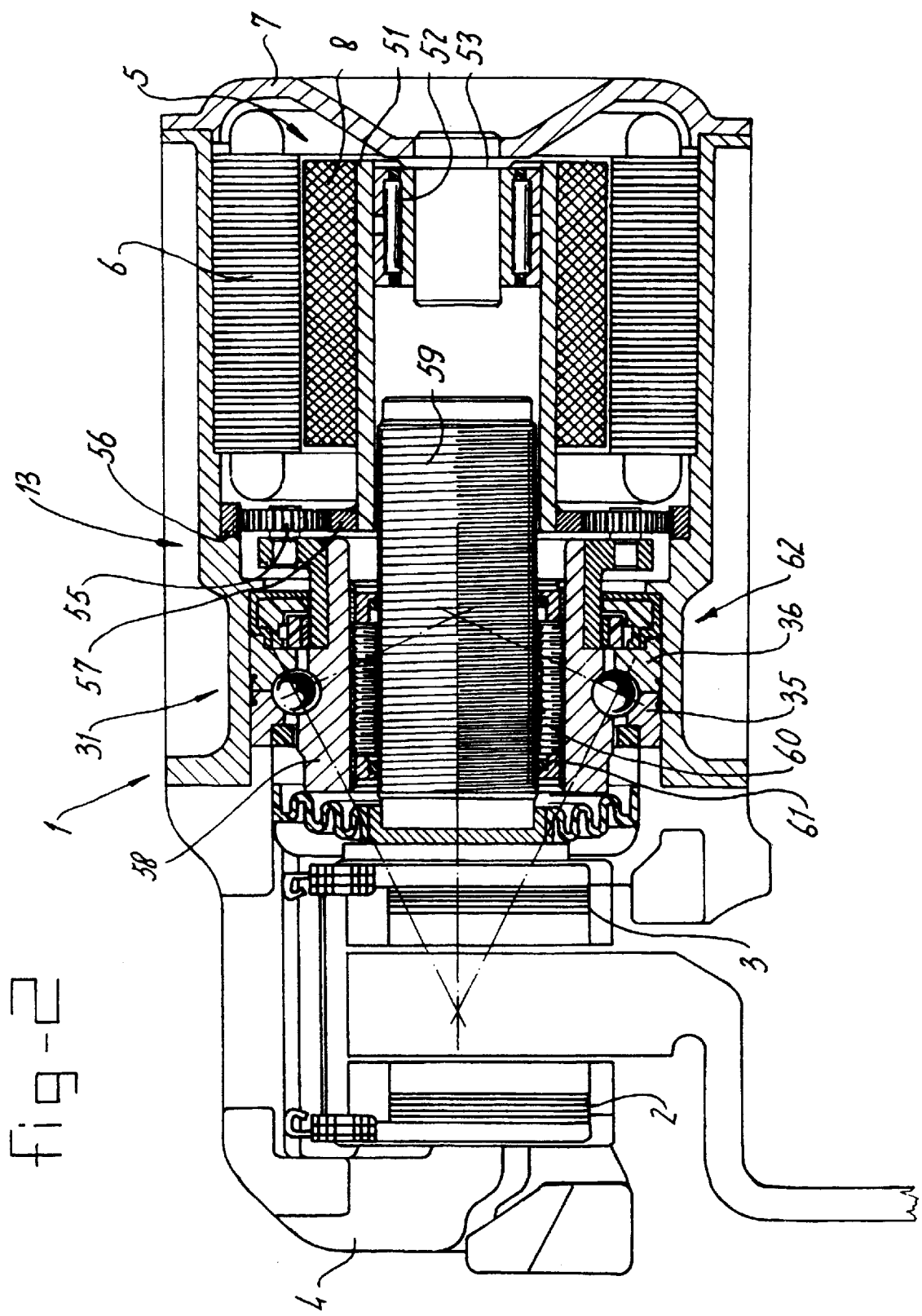
FIG. 2 shows a second embodiment.

The embodiment shown in FIG. 2 is to a large extent identical to the embodiment of FIG. 1. It has a similar brake calliper 1, brake pads 2, 3, support bearing configuration, flange 4, and an electric actuator 13.

The electric actuator is connected to an electric motor 5, having a rotational part 8 and a stator 6 connected to housing part 7.

The rotational part 8 is drivably connected to hollow support piece 51, which by means of needle bearing 52 and stub 53 is rotatably supported with respect to the housing 7. At its other end, the support piece 51 has a ring gear wheel 57 with outwardly extending teeth. Satellite gear wheels 55 are accommodated on a flange of inner ring 58, and co-operate with a ring gear wheel 56, the outer surface of which is connected to the housing 7. Furthermore, satellite gear wheel 55 co-operates with the ring gear wheel 57.

The inner ring 58 of bearing 31 co-operates with screw member 59 through the rollers 60, which are contained in cage 61. Inner bearing ring 58, screw 59, roller 60 and cage 61 together form a screw spindle known per se, and will not be described in further detail.

Inner ring 58 and outer ring half 36 furthermore carry rings which together form a sensor for measuring the amount of rotation of the inner ring 58.

Figure 3:
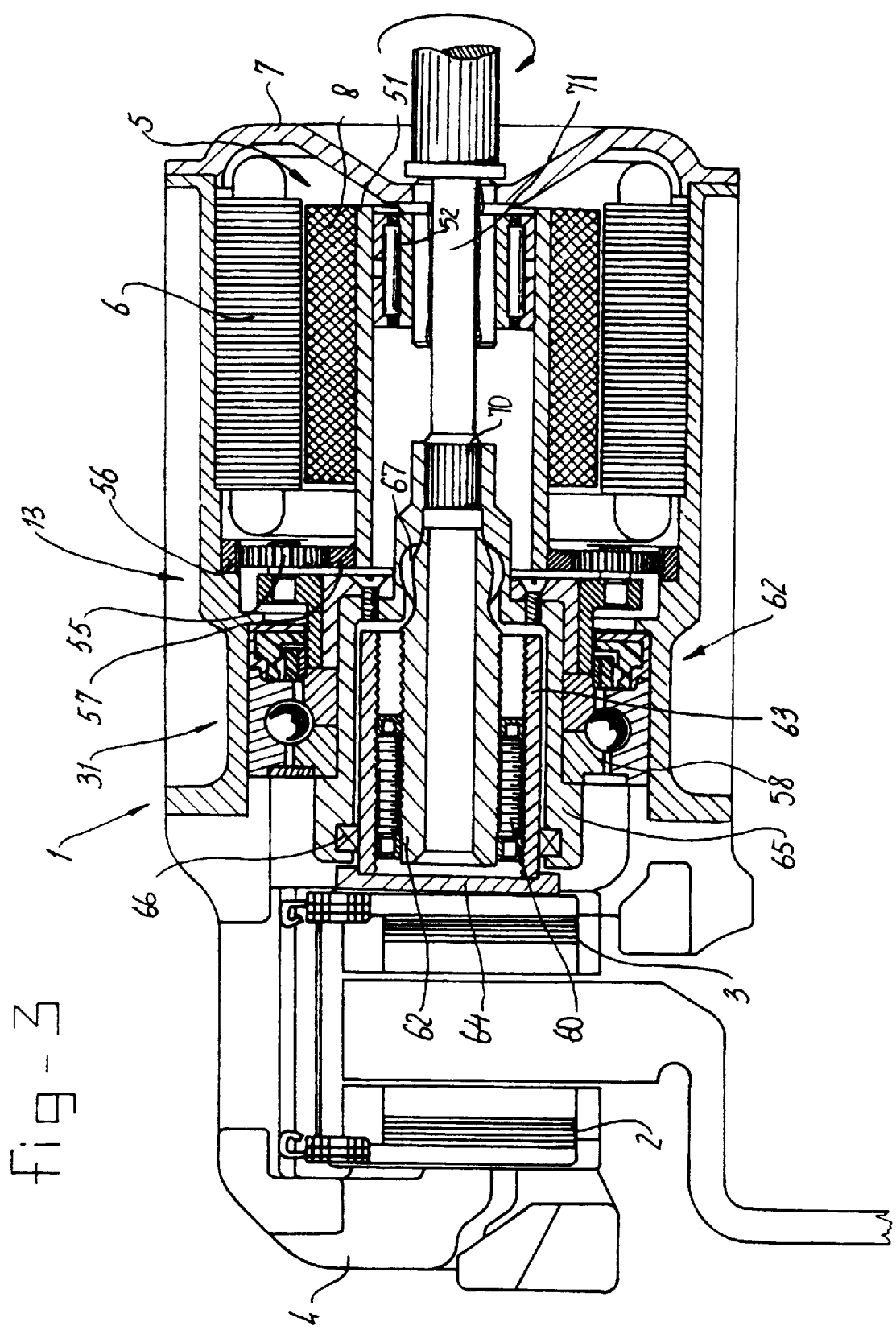
FIG. 3 shows a third embodiment.

The embodiment of FIG. 3 is to a large extent identical to the embodiment of FIG. 1, however the screw mechanism now has a screw 62 which is rotatably supported and connected to the electric motor 5, whereas the nut 63 is non-rotatably supported and connected to the brake support 64.

The screw is connected to a concentric mounting sleeve 65, which surrounds the screw and is connected to the inner ring 33 of the four-point contact ball bearing 31. The nut 60 is accommodated between the mounting sleeve 65 and the screw 62, and co-operates by means of rollers 60 with screw 62.

Furthermore, the rotatable part 1 of the electric motor 5 co-operates with the mounting sleeve through the satellite gear wheel system comprises ring gear wheel 57. Said ring gear wheel engages satellite gear wheels 55 connected to a flange of inner ring 58, which gear wheels 55 in turn engage ring gear 56 connected to the housing 7.

Furthermore, by means of a self-centring spherical coupling 67, mounting sleeve 65 is connected to hand brake shaft 71.

For purposes of sealing and damping, a sealing ring 66 is provided between mounting sleeve 65 and nut 60.

Furthermore, the mounting sleeve 65 carries a damping ring 68 having external teeth 69, which is part of the satellite gear wheel system described before.

The embodiment of FIG. 4 shows a part of the inner ring 72 of a four-point contact bearing, which inner ring forms a unity with support piece 73 which is to be connected with a rotatable part 8 of the electric motor.

The embodiment of FIG. 5 shows a four-point contact bearing comprising a unitary outer ring 75, and an inner ring 74 having two axial halves 76, 77.

Axial half 77 has internal screw thread 78, external teeth 79 which are part of the gear wheel system mentioned before, and a connecting groove 80 for connecting a sealing bellows. By means of weld 81, ring halves 76, 77 are mutually connected.

What is claimed is:

1. An electric actuator, comprising a housing which contains a screw mechanism and an electric motor which is drivably connected to the screw mechanism which provides a linear movement in response to a rotational movement of the electric motor, said screw mechanism comprising a screw and a nut one of which is supported rotatably with respect to the housing by means of an angular contact ball bearing, said angular contact ball bearing comprising two pairs of contact points, the working lines of which intersect each other, wherein one pair of contact points has a working line, the contact angle of which, with respect to the axis of the bearing, is smaller than the corresponding contact angle of the other opposing working line, and an outer ring or an inner ring of the angular contact ball bearing is a split outer ring respectively a split inner ring comprising two axial ring halves, which are pressed against one another under axial forces for providing the desired positive or negative bearing clearance.

2. The actuator according to claim 1, wherein the pair of contact points having the working line with the smaller contact angle with respect to the axis is oriented for taking a major actuating force.

3. The actuator according to claim 1, wherein the axial ring halves have facing radial abutment faces.

4. The actuator according to claim 3, wherein the axial ring halves have radial outer faces which face away from each other, said radial outer faces being for receiving axial compressive forces so as to ensure mutual contact of the radial abutment faces.

5. The actuator according to claim 4, wherein the axial ring halves are connected to each other, and have defined positive or negative clearance in axial direction, by means of clamping, gluing, welding such as laser welding, or soldering.

6. The actuator according to claim 1, wherein the outer ring has two axial ring halves.

7. The actuator according to claim 1, wherein the inner ring has two axial ring halves.

8. The actuator according to claim 6, wherein one or both ring halves are provided with a sensor for monitoring and controlling brake force feedback, wear compensation, maintenance indication, traction control and/or vehicle dynamic functions.

9. The actuator according to claim 1, wherein the nut is rotatably supported and drivably connected to the electric motor, and the screw mechanism comprises a hollow screw having a central bore opening out at one end of the screw and accommodating an actuating member, which actuating member protrudes from the open end and is connected to the screw within the bore at a distance from said open end.

10. The actuator according to claim 9, wherein the actuating member is accommodated with a radial play within the hollow screw.

11. The actuator according to claim 10, wherein the actuating member is connected to the screw by means of a sleeve which fits between said member and screw, which sleeve is at a distance from the open end and which is shorter than said member and the bore.

12. The actuator according to claim 1, wherein the nut forms an integral part of the inner bearing ring of the angular contact ball bearing.

13. The actuator according to claim 1, wherein the screw is rotatably supported and driveably connected to the electric motor, and the nut is connected to a brake pad support.

14. The actuator according to claim 13, wherein the screw is connected to a concentric mounting sleeve, which mounting sleeve at least partly surrounds the screw and which is connected to the inner ring of the angular contact ball bearing, the nut being accommodated at least partly between mounting sleeve and screw.

15. The actuator according to claim 14, wherein a ring element is provided between the mounting sleeve and the nut for sealing and/or damping purposes.

16. The actuator according to claim 14, wherein the electric motor engages the mounting sleeve.

17. The actuator according to claim 13, wherein the mounting sleeve and the screw are coupled by means of satellite gear wheel system.

18. The actuator according to claim 14, wherein the mounting sleeve is coupled to a shaft by means of a self centering spherical coupling.

19. The actuator according to claim 1, wherein the screw mechanism is a roller spindle or a ball spindle with a rotating nut or with a rotating screw.

20. The actuator according to claim 1, wherein a sensor is provided for sensing and controlling the rotational movement of the screw mechanism for brake force feed back, maintenance indication, traction control and/or vehicle dynamic functions.

21. The actuator according to claim 1, wherein the angular contact ball bearing is a single row four-point full complement contact ball bearing.

22. The actuator according to claim 1, wherein the electric motor has a rotatable part which is connected to the screw mechanism by means of a gear reduction system.

23. A brake calliper for an electrically actuatable disc brake, comprising a claw piece with two opposite brake pads and an electric actuator, said actuator comprising an electric motor and a screw mechanism which is driveably connected to the electric motor for providing a linear movement in response to a rotational movement of the electric motor, said screw mechanism comprising a screw and a nut which is supported rotatably with respect to the housing by means of an angular ball bearing, said angular contact ball bearing comprising two pairs of contact points, the working lines of which intersect each other, wherein one pair of contact points has a working line, the contact angle of which, with respect to the axis of the bearing, is smaller than the corresponding angle of the other working line, that the outer ring or the inner ring of the angular contact ball bearing is a split outer ring respectively a split inner ring comprising two axial ring halves, which are pressed against one another under axial forces for providing the desired positive or negative bearing clearance, and in that the pair of contact points with a working line having a contact angle with respect to the axis of the bearing less than the corresponding angle of the other working line, is loaded by the brake force exerted on the brake pads.

24. The brake calliper according to claim 23, wherein the outer ring of the angular contact ball bearing comprises two axial halves, which are pressed against one another under axial forces for providing the desired bearing clearance.

25. The brake calliper according to claim 24, wherein one or both ring halves are provided with a sensor for monitoring and controlling brake force feedback, wear compensation, maintenance indication, traction control and/or vehicle dynamic functions.

26. The brake calliper according to claim 24, wherein the axial ring halves have facing radial abutment faces.

27. The brake calliper according to claim 26, wherein the axial ring halves have radial outer faces which face away from each other, said radial outer faces being for receiving axial compressive forces so as to ensure mutual contact of the radial abutment faces.

28. The brake calliper according to claim 27, wherein the axial ring halves are connected to each other by means of a clamping means.

29. The brake calliper according to claim 28, wherein the bearing clearance is negative, zero or positive.

30. The brake calliper according to claim 29, wherein the outer ring has two axial ring halves with or without flanges.

31. The brake calliper according to claim 30, wherein the inner ring has two axial ring halves with or without flanges.

32. The brake calliper according to claim 24, wherein the contact angle with respect to the axis of the bearing of the pair of contact points which is loaded by the brake force exerted on the brake pads, is between 45°–70° degrees.

33. The brake calliper according to claim 23, wherein a stator of the electric motor is connected to the claw piece, and a rotatable part of said motor is connected to the screw mechanism.

34. The brake calliper according to claim 23, wherein the screw mechanism comprises a hollow screw having a central bore opening out at one end of the screw and accommodating an actuating member, which actuating member protrudes from the open end and is connected to the screw within the bore at a distance from said open end, wherein the actuating member cooperates with one of the brake pads and the screw mechanism cooperates with the opposite brake pad.

35. The brake calliper according to claim 34, wherein a rotatable part of the electric motor is accommodated on a support piece which is rotatably supported in a claw piece, and which is in cooperation with the nut of a roller spindle or a ball spindle.

36. The brake calliper according to claim 23, wherein the screw is rotatably supported and driveably connected to the electric motor, and the nut is connected to a brake pad support.

37. The brake calliper according to claim 36, wherein the screw is connected to a concentric mounting sleeve, which mounting sleeve at least partly surrounds the screw and which is connected to the inner ring of the angular contact ball bearing, the nut being accommodated at least partly between mounting sleeve and screw.

38. The brake calliper according to claim 37, wherein a ring element is provided between the mounting sleeve and the nut for sealing and/or damping purposes.

39. The brake calliper according to claim 37, wherein the electric motor engages the mounting sleeve.

40. The brake calliper according to claim 37, wherein the mounting sleeve and the screw are coupled by means of a satellite gear wheel system.

41. The brake calliper according to claim 23, wherein the mounting sleeve is coupled to a shaft by means of a self centering spherical coupling.

42. The brake calliper according to claim 23, wherein the rotating actuator part is connected to a hand brake drive, which is activatable.

43. The brake calliper according to claim 23, wherein the electric motor has a rotatable part which is connected to the screw mechanism by means of a gear reduction system.

44. The brake calliper according to claim 23, wherein the screw mechanism is a roller spindle or a ball spindle with a rotating nut or screw.

45. The brake calliper according to claim 44, wherein the nut of the spindle forms an integral part of the inner bearing ring of the angular contact ball bearing.

46. The brake calliper according to claim 22, wherein a sensor or a sensorized bearing is provided for sensing the rotational movement of the screw mechanism.

47. The brake calliper according to claim 24, wherein the ring halves are connected by means of clamping, gluing, welding such as laser welding, or soldering.

48. The brake calliper according to claim 23, wherein at least one of the components of the screw mechanism, a bearing and a gear wheel system is obtained by means of a hard turning operation.

* * * * *